(12) United States Patent
Fan et al.

(10) Patent No.: US 9,160,448 B2
(45) Date of Patent: Oct. 13, 2015

(54) APPARATUS AND METHOD FOR ESTIMATING INTRA-CHANNEL NONLINEAR DAMAGE

(71) Applicant: Fujitsu Limited, Kawasaki-shi, Kanagawa (JP)

(72) Inventors: Yangyang Fan, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/310,774

(22) Filed: Jun. 20, 2014

(65) Prior Publication Data

US 2015/0010300 A1  Jan. 8, 2015

(30) Foreign Application Priority Data

Jun. 27, 2013 (CN) .......................... 2013 1 0261680

(51) Int. Cl.
- *H04B 10/08* (2006.01)
- *H04B 10/073* (2013.01)
- *H04B 10/079* (2013.01)

(52) U.S. Cl.
CPC ...... *H04B 10/0731* (2013.01); *H04B 10/07951* (2013.01)

(58) Field of Classification Search
CPC ................... H04B 10/07951; H04B 10/07953; H04B 10/0731; H04B 10/079
USPC .......................................... 398/147, 159, 29
See application file for complete search history.

(56) References Cited

U.S. PATENT DOCUMENTS

| | | | | |
|---|---|---|---|---|
| 8,311,417 | B1 * | 11/2012 | Poggiolini et al. | 398/208 |
| 8,515,277 | B2 * | 8/2013 | Tanimura et al. | 398/25 |
| 2006/0013589 | A1 * | 1/2006 | Odate et al. | 398/147 |
| 2012/0219303 | A1 * | 8/2012 | Li et al. | 398/208 |
| 2013/0077963 | A1 * | 3/2013 | Mateo et al. | 398/29 |

\* cited by examiner

*Primary Examiner* — M. R. Sedighian
(74) *Attorney, Agent, or Firm* — Staas & Halsey LLP

(57) ABSTRACT

An apparatus and method for estimating intra-channel nonlinear damage, including: a first determining unit configured to determine a nonlinear phase shift weighting dispersion distribution function of an optical fiber transmission link according to a parameter of the optical fiber transmission link; a segmenting unit configured to segment the nonlinear phase shift weighting dispersion distribution function of the optical fiber transmission link into at least one rectangle; a calculating unit configured to respectively calculate a nonlinear perturbation coefficient of each rectangle in the at least one rectangle, and perform summation on the nonlinear perturbation coefficients of all the rectangles, so as to obtain a nonlinear perturbation coefficient of the optical fiber transmission link; and a second determining unit configured to determine intra-channel nonlinear damage of the optical fiber transmission link according to the nonlinear perturbation coefficient of the optical fiber transmission link.

14 Claims, 8 Drawing Sheets

APPARATUS AND METHOD FOR ESTIMATING INTRA-CHANNEL NONLINEAR DAMAGE

CROSS REFERENCE TO RELATED APPLICATIONS

This application claims the benefit of Chinese Application No. 201310261680.8, filed Jun. 27, 2013, the disclosure of which is incorporated herein by reference.

TECHNICAL FIELD

The present invention relates to the field of communications, and in particular to an apparatus and method for estimating intra-channel nonlinear damage in an optical fiber communication system.

BACKGROUND ART

Currently, as continuous updates of an optical fiber communication system from 100 Gbits/s to 400 Gbits/s or higher transmission rate of a single channel, an intra-channel nonlinear effect in an optical fiber transmission link has become one of important damages affecting the system performance. The key to the study of influence on an effect of nonlinear to the system performance resides in how to quantitatively describe and estimate signal distortion resulted from the effect of nonlinear, so as to provide basis for alleviating or compensating for nonlinear damage.

A basis for the study of an effect of nonlinear in an optical fiber transmission link is a nonlinear equation, which describes an evolution of an optical pulse during transmission. However, as the nonlinear equation is a nonlinear partial differential equation, such a kind of equation usually has no analytic solution. At present, a numerical method that has been widely used is a split-step Fourier (SSF) method, in which a problem of high complexity of calculation exists, resulting in an algorithm of back propagation (BP) digital signal processing of nonlinear damage compensation based on such a method is hard to be carried out. Although an approximation analytic method based on a perturbation theory has an advantage of low complexity, a perturbation model used in an existing method is based on an assumption of a lossless large dispersion link, the analysis and estimation of which on intra-channel nonlinear damage being limited to an optical fiber transmission link without dispersion compensation, and being inapplicable to a current typical dispersion compensation link. FIG. 1 is a schematic diagram of similarity of additive nonlinear noise time-domain waveforms estimated by using the perturbation model and the SSF method at different dispersion compensation rates. As shown in FIG. 1, a value of the similarity is lowered as the increase of the dispersion compensation rate, that is, the similarity of the waveforms of the perturbation model and the SSF method is lowered gradually when the dispersion compensation rate is increased gradually. FIG. 2 is a schematic diagram of comparison of additive nonlinear noise power estimated by using the perturbation model and the SSF method at different dispersion compensation rates. As shown in FIG. 2, the nonlinear damage in a link having dispersion compensation estimated by the perturbation model is invalid.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

An object of the embodiments of the present invention is to provide an apparatus and method for estimating intra-channel nonlinear damage, in which nonlinear damage in any dispersion management link may be estimated, and complexity of calculation may be lowered. Furthermore, the apparatus and method may be applicable to a single-polarization system or a polarization multiplexing system, and may be compatible with any modulation formats.

According to an aspect of the embodiments of the present invention, there is provided an apparatus for estimating intra-channel nonlinear damage, comprising:

a first determining unit configured to determine a nonlinear phase shift weighting dispersion distribution function of an optical fiber transmission link according to a parameter of the optical fiber transmission link; a segmenting unit configured to segment the nonlinear phase shift weighting dispersion distribution function of the optical fiber transmission link into at least one rectangle; a calculating unit configured to respectively calculate a nonlinear perturbation coefficient of each rectangle in the at least one rectangle, and perform summation on the nonlinear perturbation coefficients of all the rectangles, so as to obtain a nonlinear perturbation coefficient of the optical fiber transmission link; and a second determining unit configured to determine intra-channel nonlinear damage of the optical fiber transmission link according to the nonlinear perturbation coefficient of the optical fiber transmission link.

According to another aspect of the embodiments of the present invention, there is provided a method for estimating intra-channel nonlinear damage, comprising:

determining a nonlinear phase shift weighting dispersion distribution function of an optical fiber transmission link according to a parameter of the optical fiber transmission link; segmenting the nonlinear phase shift weighting dispersion distribution function of the optical fiber transmission link into at least one rectangle; calculating respectively a nonlinear perturbation coefficient of each rectangle in the at least one rectangle; performing summation on the nonlinear perturbation coefficients of each rectangle, so as to obtain a nonlinear perturbation coefficient of the optical fiber transmission link; and determining intra-channel nonlinear damage of the optical fiber transmission link according to the nonlinear perturbation coefficient of the optical fiber transmission link.

The advantage of the embodiments of the present invention resides in that nonlinear damage in any dispersion management link may be estimated, and complexity of calculation may be lowered. Furthermore, the apparatus and method may be applicable to a single-polarization system or a polarization multiplexing system, and may be compatible with any modulation formats.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION OF THE INVENTION

Figure 1:
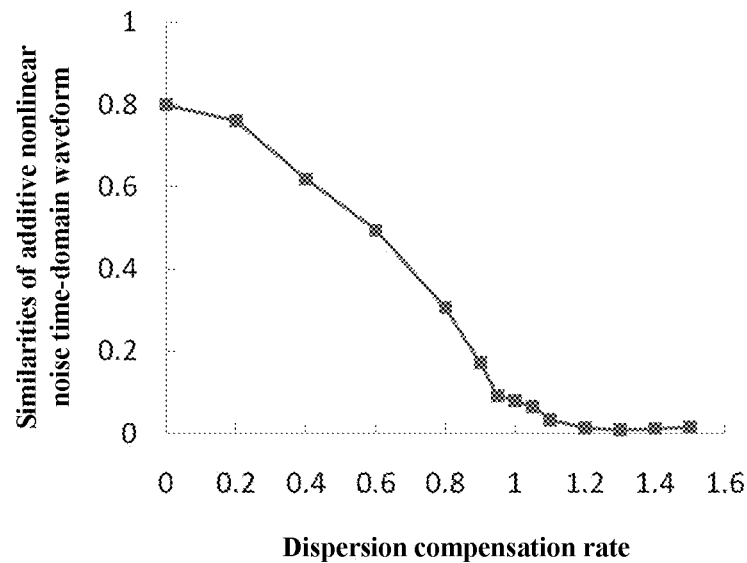
FIG. 1 is a schematic diagram of similarity of additive nonlinear noise time-domain waveforms estimated by using the perturbation model and the SSF method at different dispersion compensation rates.
Figure 2:
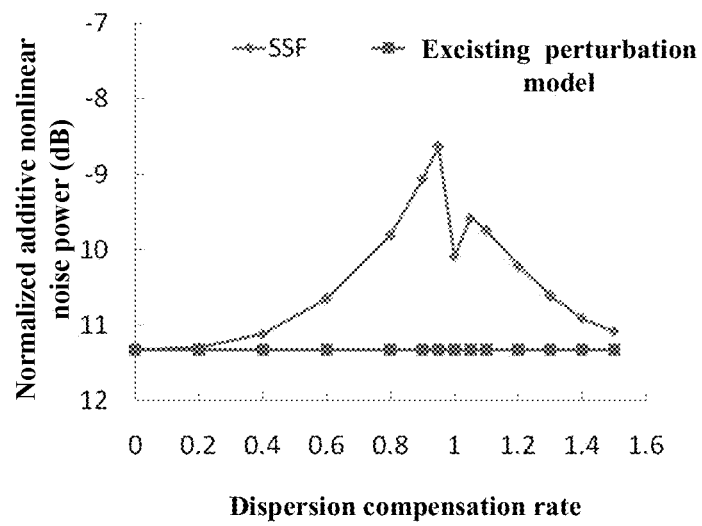
FIG. 2 is a schematic diagram of comparison of additive nonlinear noise power estimated by using the perturbation model and the SSF method at different dispersion compensation rates.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Currently, a basis for the study of an effect of nonlinear in an optical fiber transmission link is a nonlinear equation, which describes an evolution of an optical pulse during transmission. For a case of random rotation of polarization in an optical fiber, the evolution of the optical pulse during transmission may be described by using the following Manakov nonlinear equation:

$$\frac{\partial}{\partial z}u_H(t,z) + \frac{\alpha}{2}u_H(t,z) + j\frac{\beta_2}{2}\frac{\partial^2}{\partial t^2}u_H(t,z) = \qquad (1)$$
$$j\frac{8}{9}\gamma[|u_H(t,z)|^2 + |u_V(t,z)|^2]u_H(t,z)$$
$$\frac{\partial}{\partial z}u_V(t,z) + \frac{\alpha}{2}u_V(t,z) + j\frac{\beta_2}{2}\frac{\partial^2}{\partial t^2}u_V(t,z) = $$
$$j\frac{8}{9}\gamma[|u_H(t,z)|^2 + |u_V(t,z)|^2]u_V(t,z)$$

where, $u_H(t,z)$ and $u_V(t,z)$ are electrical field components in H and V polarization states respectively, $\alpha$, $\beta_2$ and $\gamma$ denote respectively a distribution of an attenuation coefficient, a dispersion coefficient and a nonlinear coefficient in an optical fiber transmission link along a transmission distance, and t and z denote respectively a transmission time and a distance of an optical pulse in the optical fiber transmission link.

According to the perturbation theory, under a one-step approximation condition, nonlinear damage may be deemed as an additive noise. A waveform of a receiving signal after transmission of a distance L may be expressed as:

$$u_H(t,z=L)=u_H(t,z=0)+\Delta u_H(t,z=L)$$
$$u_V(t,z=L)=u_V(t,z=0)+\Delta u_V(t,z=L) \qquad (2)$$

where, $\Delta u_H(t,z)$ and $\Delta u_V(t,z)$ denote respectively a one-step nonlinear noise in H and V polarization states.

At z=0, a transmission signal may be expressed as a superposition of multiple pulse sequences:

$$u_H(t, z=0) = \sum_k H_k g(t-kT, z=0) \quad (3)$$

$$u_V(t, z=0) = \sum_k V_k g(t-kT, z=0)$$

where, $H_k$ and $V_k$ denote respectively an information symbol of a k-th pulse in H and V polarization states, T is a pulse interval, g(t,z) is a pulse waveform, and k is an integer greater than 0.

Substituting equations (2) and (3) for equation (1), and sampling a signal at an optimal sampling time t=kT, an additive nonlinear noise at the distance L in the H and V polarization states at the optimal sampling time may be obtained:

$$\Delta u_H(t=kT, z=L) = \quad (4)$$

$$\sum_{m,n}(H_{m+k}H_{n+k}H^*_{m+n+k} + H_{m+k}V_{n+k}V^*_{m+n+k})Coef(m,n,z=L)$$

$$\Delta u_V(t=kT, z=L) =$$

$$\sum_{m,n}(V_{m+k}V_{n+k}V^*_{m+n+k} + V_{m+k}H_{n+k}H^*_{m+n})Coef(m,n,z=L)$$

where, $\Delta u_H(t=kT,z=L)$ and $\Delta u_V(t=kT,z=L)$ denote respectively an additive nonlinear noise at the distance L in the H and V polarization states at the optimal sampling time, Coef(m,n,z=L) denotes a nonlinear perturbation coefficient at the distance L, m and n denote time sequences of three pulses generating nonlinear noises at time t=kT, that is, subscripts m+k, n+k and m+n+k of each trinomial product in equation (4), and * denotes a conjugate operation.

The nonlinear noises in equation (4) may be divided into two classes, that is, intra-channel four wave mixing (IFWM) and intra-channel cross-phase modulation (IXPM), which are expressed as:

$$\Delta_{IFWM,H}(t=kT, z=L) = \quad (5)$$

$$\sum_{m\neq 0, n\neq 0} H_{m+k}H_{n+k}H^*_{m+n+k}Coef(m,n,z=L) +$$

$$\sum_{m=0,n} H_{m+k}V_{n+k}V^*_{m+n+k}Coef(m,n,z=L)$$

$$\phi_{IXPM,H}(t=kT, z=L) = \text{Im}\Big[|H_k|^2 Coef(0,0,z=L) +$$

$$2\sum_{n\neq 0}|H_{n+k}|^2 Coef(0,n,z=L) + \sum_n |V_{n+k}|^2 Coef(0,n,z=L)\Big]$$

where, $\Delta_{IFWM,H}(t=kT,z=L)$ and $\phi_{IXPM,H}(t=kT,z=L)$ denote respectively an IFWM noise and an IXPM noise at the distance L in H polarization states at the optimal sampling time, and the symbol Im denotes an imaginary part taking operation.

An IFWM expression and an IXPM expression in the H polarization state are given in equation (5), and an IFWM noise and an IXPM noise in the V polarization state may be respectively obtained by substituting the symbol H with V. And the symbol Im denotes an imaginary part taking operation.

In consideration that IXPM itself is a process of phase modulation, the additive nonlinear model in equation (2) may be modified into an additive-multiplicative model, which is expressed as follows:

$$u_H(t=kT,z=L)=[u_H(t=kT,z=0)+\Delta_{IFWM,H}(t=kT,z=L)]*\exp[j*\phi_{IXPM,H}(t=kT,z=L)]$$

$$u_V(t=kT,z=L)=[u_V(t=kT,z=0)+\Delta_{IFWM,V}(t=kT,z=L)]*\exp[j*\phi_{IXPM,V}(t=kT,z=L)] \quad (6)$$

where, a nonlinear perturbation coefficient Coef(m,n,z) may be expressed as:

$$Coef(m,n,z) = \quad (7)$$

$$j\frac{8}{9}L_{eff}\int_{-\infty}^{+\infty}\int_{-\infty}^{+\infty} g(t_1-mT)g(t_2-nT)g^*(t_1+t_2-(m+n)T)$$

$$dt_1 dt_2 \int_{-\infty}^{+\infty}\frac{J(C)}{|C|}e^{j\frac{t_1 t_2}{C}}dC$$

Where, equation (7) shows that Coef(m,n,z) at a certain distance is a two-dimensional matrix, the sequence number of a row and a column of a element in the matrix being denoted by m and n respectively. * in the equation denotes a conjugate operation. $C(z)=\int_0^z \beta_2(z')dz''$ is a dispersion accumulative function, and J (C) denotes a nonlinear phase shift weighting dispersion distribution function of an optical fiber transmission link, which is only related to parameters of the optical fiber transmission link and may be expressed as follows:

$$J(C) = \frac{1}{L_{eff}}\sum_i \gamma_i[z_i(C)]\exp\{G[z_i(C)]\}\left|\frac{dz_i(C)}{dC}\right| \quad (8)$$

where, $\gamma_i$ denotes a nonlinear coefficient of an i-th optical fiber span, $z_i(C)$ denotes an inverse function of a dispersion accumulative function C(z) of the i-th span of the optical fiber transmission link, $G[z_i(C)]$ denotes a loss/gain function of the i-th span of the optical fiber transmission link, and $L_{eff}=\int_0^L \gamma(z)\exp[G(z)]dz$ denotes an effective length of the link, i being an integer greater than 0.

Where, J (C) is a quantity of normalization, and a graphical area enclosed by a J (C) curve and an accumulative dispersion axis is constantly 1, that is, $\int_{-\infty}^{+\infty} J(C)dC=1$.

Figure 3:
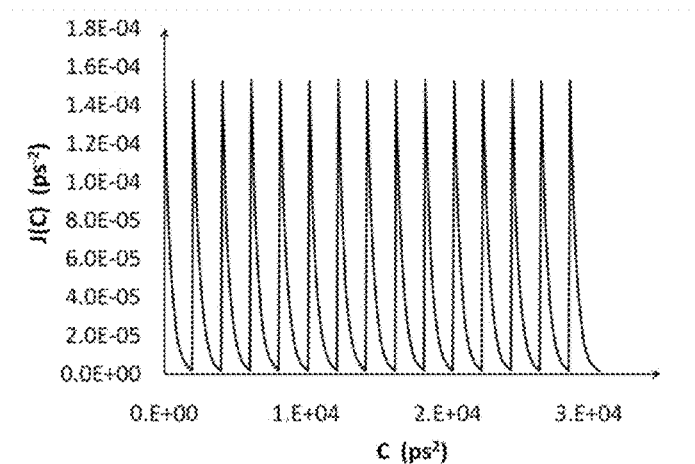
FIG. 3 is a schematic diagram of a function J (C) in case of no dispersion compensation (i.e. a dispersion compensation rate is 0)
Figure 4:
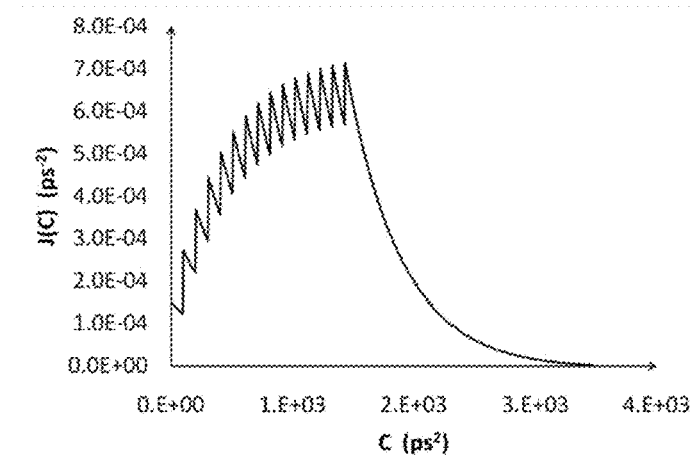
FIG. 4 is a schematic diagram of a function J (C) in a case where a dispersion compensation rate is 95%.

FIG. 3 is a schematic diagram of a function J (C) in case of no dispersion compensation (i.e. a dispersion compensation rate is 0), and FIG. 4 is a schematic diagram of a function J (C) in a case where a dispersion compensation rate is 95%. In FIGS. 3 and 4, an optical fiber transmission link contains 15 optical fiber spans, the length of each span is 100 km, a dispersion coefficient is $\beta_2$=20.5 ps$^2$/km, an attenuation coefficient is $\alpha$=0.2 dB/km and a nonlinear coefficient is $\gamma$=1.32 W$^{-1}$/km. According to equation (7) and as shown in FIGS. 3 and 4, as a loss/gain function varies cyclically along optical fiber spans, J (C) is an inconsecutive or non-consecutive function in a toothed shape. Hence, an analytic closed-form solution is hard to be obtained for the nonlinear perturbation coefficient in equation (7).

A problem of high complexity exists in the existing SSF method, and the existing perturbation model based on an assumption of a lossless large dispersion link is inapplicable to an existing typical dispersion compensation link.

Embodiments of the present invention provide an apparatus and method for estimating intra-channel nonlinear damage, in which nonlinear damage in any dispersion management link may be estimated, and complexity of calculation may be lowered. Furthermore, the apparatus and method may be applicable to a single-polarization system or a polarization multiplexing system, and may be compatible with any modulation formats.

The apparatus and method for estimating intra-channel nonlinear damage shall be described below with reference to the accompanying drawings.

Embodiment 1

Figure 5:
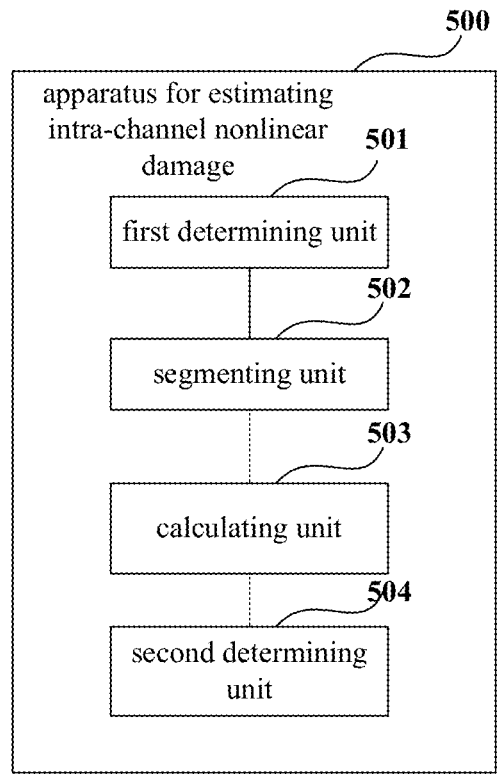
FIG. 5 is a schematic diagram of the structure of the apparatus for estimating intra-channel nonlinear damage of Embodiment 1 of the present invention.

FIG. 5 is a schematic diagram of the structure of the apparatus 500 for estimating intra-channel nonlinear damage of Embodiment 1 of the present invention. As shown in FIG. 5, the apparatus includes: a first determining unit 501, a segmenting unit 502, a calculating unit 503 and a second determining unit 504, wherein, first determining unit 501 is configured to determine a nonlinear phase shift weighting dispersion distribution function of an optical fiber transmission link according to a parameter of the optical fiber transmission link;

segmenting unit 502 is configured to segment the nonlinear phase shift weighting dispersion distribution function of the optical fiber transmission link into at least one rectangle;

calculating unit 503 is configured to respectively calculate a nonlinear perturbation coefficient of each rectangle in the at least one rectangle, and perform summation on the nonlinear perturbation coefficients of all the rectangles, so as to obtain a nonlinear perturbation coefficient of the optical fiber transmission link;

and second determining unit 504 is configured to determine intra-channel nonlinear damage of the optical fiber transmission link according to the nonlinear perturbation coefficient of the optical fiber transmission link.

It can be seen from the above embodiment that an analytic closed-form solution of the nonlinear perturbation coefficient of the optical fiber transmission link may be simply obtained by segmenting the nonlinear phase shift weighting dispersion distribution function of the optical fiber transmission link into at least one rectangle, that is, approximating the nonlinear phase shift weighting dispersion distribution function by using the at least one rectangle, and calculating respectively a nonlinear perturbation coefficient of each rectangle. Therefore, nonlinear damage in any dispersion management link may be estimated, and complexity of calculation may be lowered. Furthermore, the apparatus and method may be applicable to a single-polarization system or a polarization multiplexing system, and may be compatible with any modulation formats.

In this embodiment, first determining unit 501 is configured to determine the nonlinear phase shift weighting dispersion distribution function of the optical fiber transmission link according to the parameter of the optical fiber transmission link; wherein the method for determining the nonlinear phase shift weighting dispersion distribution function may employ any method in the prior art. For example, the embodiment of the present invention may employ the following method:

assuming that a length of an i-th span of the optical fiber transmission link is $L_i$, and an attenuation coefficient is $G(z_i)$, and assuming that a dispersion coefficient $\beta_{2,i}$, an attenuation coefficient $\alpha_i$ and a nonlinear coefficient $\gamma_i$ of the optical fiber of each span are all constants; and the above parameters of each span may be identical or different, no matter whether the types of the optical fiber of each span are identical.

Substituting the above conditions for equation (8), it may be obtained that:

$$J(C) = \frac{1}{L_{\mathit{eff}}} \sum_{i} \gamma_i \exp\left[G\left(\frac{C - \sum_{p=1}^{i-1} \beta_{2,p} L_{0,p}}{\beta_{2,i}}\right)\right] \frac{1}{|\beta_{2,i}|} \quad (9)$$

Figure 6:
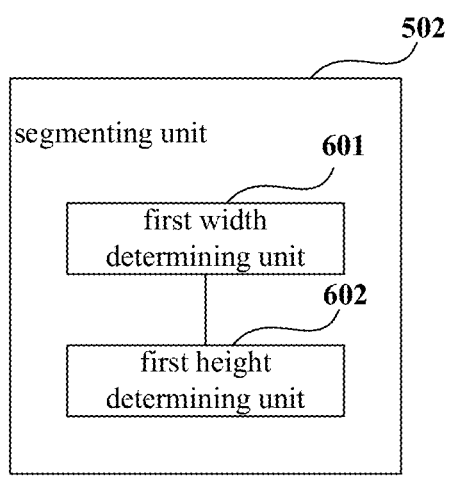
FIG. 6 is a schematic diagram of the structure of a segmenting unit of Embodiment 1 of the present invention.

In this embodiment, segmenting unit 502 is configured to segment the nonlinear phase shift weighting dispersion distribution function of the optical fiber transmission link into at least one rectangle. Wherein, the segmenting unit may employ any structure capable of executing the above segmenting function. FIG. 6 is a schematic diagram of the structure of the segmenting unit of this embodiment. However, the present invention is not limited to such a structure.

As shown in FIG. 6, the segmenting unit 502 may further include a first width determining unit 601 and a first height determining unit 602; wherein, first width determining unit 601 is configured to section an accumulated dispersion value of the optical fiber transmission link to obtain two boundary accumulated dispersion values of each section, and take the difference between the two boundary accumulated dispersion values of each section as the width of the rectangle to which the section corresponds;

and first height determining unit 602 is configured to determine the height of each rectangle, so that an area of each rectangle is respectively equal to an area under a curve of the nonlinear phase shift weighting dispersion distribution function between the two boundary accumulated dispersion values of each rectangle.

The determination of the height of each rectangle by using a principle of equal area can ensure that a sum of areas of all the rectangles is equal to an area under a curve of the nonlinear phase shift weighting dispersion distribution function of the optical fiber transmission link.

Figure 7:
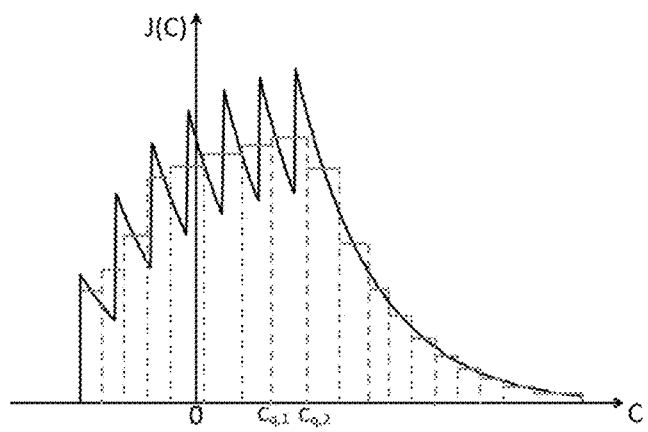
FIG. 7 is a schematic diagram of a mode of implementation for segmenting a function J (C) by using a segmenting unit of Embodiment 1 of the present invention.

FIG. 7 is a schematic diagram of a mode of implementation for segmenting a nonlinear phase shift weighting dispersion distribution function by using segmenting unit 502. As shown in FIG. 7, the nonlinear phase shift weighting dispersion distribution function is segmented into several closely aligned rectangles, the boundaries of which being denoted by dotted lines in the figure.

Wherein, each rectangle may be expressed as:

$$J_q(C) = H_q[f(C - C_{q,1}) - f(C - C_{q,2})] \quad (10)$$

where, $f(C)$ denotes a step function of an amplitude being 1, C denotes an accumulated dispersion value of the optical fiber transmission link, the first width determining unit 601 sectioning the accumulated dispersion value C, $C_{q,1}$ and $C_{q,2}$ denote boundary accumulative dispersion values of a q-th section, a difference $C_{q,2} - C_{q,1}$ of the boundary accumulative dispersion values of the q-th section being taken as a width of a q-th rectangle, and $H_q$ denotes the height of the q-th rectangle, q being an integer greater than 0.

In this embodiment, homogeneous sectioning may be employed to section the accumulated dispersion value C, that is, widths of each section are identical, or inhomogeneous sectioning may also be employed, that is, widths of each section are different.

Wherein, Hq may be determined by first height determining unit 602 according to a principle of equal area, that is, Hq is determined so that the area of the q-th rectangle is equal to an area under a curve of the function J (C) between two boundary accumulative dispersion values, that is Cq,1 and Cq,2 of the q-th rectangle. Hence, Hq may be expressed by the following equation:

$$H_q = \frac{\int_{C_{q,1}}^{C_{q,2}} J(C) dC}{C_{q,2} - C_{q,1}} \quad (11)$$

In this way, a sum of the areas of all the rectangles is equal to the area under the curve of the function J (C), and as the area under the curve of the function J (C) is 1, the sum of the areas of all the rectangles is $\Sigma_q H_q (C_{q,2} - C_{q,1}) = 1$.

The function J (C) may be expressed as follows after it is approximated by using at least one rectangle:

$$\hat{J}(C) = \sum_q J_q(C) = \sum_q H_q [f(C - C_{q,2}) - f(C - C_{q,2})] \quad (12)$$

In this embodiment, calculating unit 503 respectively calculates a nonlinear perturbation coefficient of each rectangle in the at least one rectangle, and a nonlinear perturbation coefficient to which each rectangle $J_q(C)$ corresponds may be obtained by substituting equation (10) for equation (7):

$$Coef_q(m, n, z) = \quad (13)$$
$$j\frac{8L_{eff}H_q}{9} \int_{-\infty}^{+\infty} \int_{-\infty}^{+\infty} g(t_1 - mT)g(t_2 - nT)g^*(t_1 + t_2 - (m+n)T)$$
$$dt_1 dt_2 \int_{C_{q,1}}^{C_{q,2}} \frac{1}{|C|} e^{j\frac{t_1 t_2}{C}} dC$$

where, $Coef_q(m,n,z)$ denotes a nonlinear perturbation coefficient to which the q-th rectangle corresponds, t1 and t2 denote time integral variables, and T denote a pulse interval.

A closed-form solution of equation (13) may be obtained by using existing means of pulse form approximation. In a mode of implementation, assuming that each rectangle satisfies a large dispersion approximation condition $|C_{q,i}| \gg \tau^2$, where, τ is a Gaussian pulse width factor, equation (13) may be expressed as follows:

$$Coef_q(m, n, z) = j\frac{8L_{eff}H_q\tau^2}{9\sqrt{3}}\left[E_1\left(-j\frac{mnT^2}{C_{q,2}}\right) - E_1\left(-j\frac{mnT^2}{C_{c,1}}\right)\right] \quad (14)$$

where, $E_1(x) = \int_x^\infty (e^{-t}/t)dt$ denotes an exponential integral function, a value of which may be obtained by looking up a table. Thus, relatively high efficiency of calculation may be obtained when equation (14) is used for calculating a nonlinear perturbation coefficient.

After the nonlinear perturbation coefficient to which each rectangle corresponds is obtained, calculating unit 503 sums up the nonlinear perturbation coefficients of all the rectangles, so as to obtain the nonlinear perturbation coefficient of the optical fiber transmission link, which is expressed as follows:

$$Coef(m, n, z) = \sum_q Coef_q(m, n, z) = \quad (15)$$
$$j\frac{8L_{eff}\tau^2}{9\sqrt{3}} \sum_q H_q\left[E_1\left(-j\frac{mnT^2}{C_{q,2}}\right) - E_1\left(-j\frac{mnT^2}{C_{q,1}}\right)\right]$$

where, Coef(m,n,z) denotes the nonlinear perturbation coefficient of the optical fiber transmission link, and $Coef_q$ (m,n,z) denotes the nonlinear perturbation coefficient to which the q-th rectangle corresponds.

In this embodiment, when $$C_{q,i} < 0, E_1\left(-j\frac{mnT^2}{C_{q,i}}\right)$$

in equation (15) may be modified as $$-\left[E_1\left(-j\frac{mnT^2}{|C_{q,i}|}\right)\right]^*,$$

where, "*" denotes a conjugate operation.

In this way, an analytic closed-form solution of the nonlinear perturbation coefficient of the optical fiber transmission link is obtained by using equation (15), and second determining unit 504 may use equation (2) or (6) to obtain a nonlinear damage time-domain waveform of an optical signal transmitted in the optical fiber transmission link according to the nonlinear perturbation coefficient, thereby determining intra-channel nonlinear damage of the optical fiber transmission link.

And, the apparatus for estimating intra-channel nonlinear damage of this embodiment is not only applicable to a link without dispersion compensation, but also to a dispersion management link. At the same time, this apparatus is not limited to be applicable to a standard attenuation link, rather, it is applicable to a link having an exponential gain or an attenuation/gain function in other forms, such a link having a Raman amplifier.

In this embodiment, in calculating the nonlinear perturbation coefficient of each rectangle by calculating unit 503, for a section unsatisfying or not satisfying the large dispersion approximation condition, the height of the rectangle to which the section corresponds may be lowered or set to be 0.

In this embodiment, in calculating the nonlinear perturbation coefficient of each rectangle by calculating unit 503, if a case where $C_{q,i}=0$ appears in a section, a value of the exponential integral function in equation (14) to which the section corresponds may be set to be 0.

In this embodiment, segmenting unit 502 may also segment the nonlinear phase shift weighting dispersion distribution function into at least one rectangle according to the inconsecutive points of the nonlinear phase shift weighting dispersion distribution function; wherein, two boundary values of each rectangle correspond to two neighboring inconsecutive points of the nonlinear phase shift weighting dispersion distribution function, or correspond to one boundary point and one inconsecutive point neighboring the boundary point of the nonlinear phase shift weighting dispersion distribution function.

Figure 8:
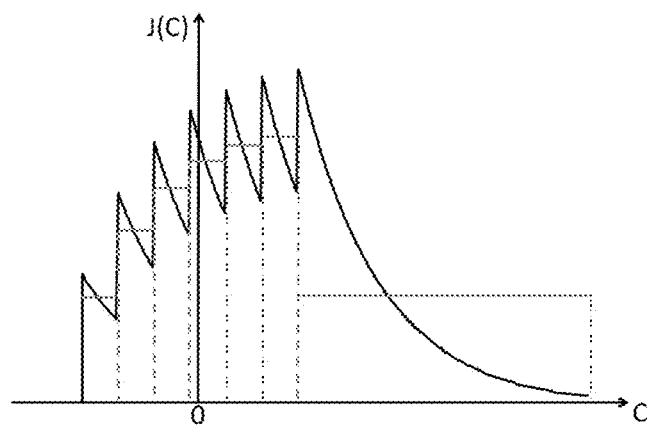
FIG. 8 is a schematic diagram of a mode of implementation for segmenting a function J (C) according to inconsecutive points of the function J (C) of Embodiment 1 of the present invention.

FIG. 8 is a schematic diagram of a mode of implementation for segmenting a function J (C) according to inconsecutive points of the function J (C) of Embodiment 1 of the present invention. As shown in FIG. 8, the function J (C) is segmented into 7 rectangles according to the inconsecutive points of the function J (C). Therefore, the calculation of the nonlinear perturbation coefficient to which each rectangle corresponds according to equation (14) needs only to be performed 7 times, and the nonlinear perturbation coefficient of the optical fiber transmission link hence obtained may be expressed as:

$$\text{Coef}(m, n, z) = j\frac{8L_{\text{eff}}\tau^2}{9\sqrt{3}} \sum_{q=1}^{7} H_q\left[E_1\left(-j\frac{mnT^2}{C_{q,2}}\right) - E_1\left(-j\frac{mnT^2}{C_{q,1}}\right)\right] \quad (16)$$

In this way, the complexity of calculation may be further simplified, thereby improving efficiency of calculation.

It can be seen from the above embodiment that an analytic closed-form solution of the nonlinear perturbation coefficient of the optical fiber transmission link may be simply obtained by segmenting the nonlinear phase shift weighting dispersion distribution function of the optical fiber transmission link into at least one rectangle, that is, approximating the nonlinear phase shift weighting dispersion distribution function by using the at least one rectangle, and calculating respectively a nonlinear perturbation coefficient of each rectangle. Therefore, nonlinear damage in any dispersion management link may be estimated, and complexity of calculation may be lowered. Furthermore, the apparatus may be applicable to a single-polarization system or a polarization multiplexing system, and may be compatible with any modulation formats.

Furthermore, by segmenting the nonlinear phase shift weighting dispersion distribution function of the optical fiber transmission link into at least one rectangle according to the inconsecutive points of the nonlinear phase shift weighting dispersion distribution function, the complexity of calculation may be further simplified, thereby improving efficiency of calculation.

Embodiment 2

Figure 9:
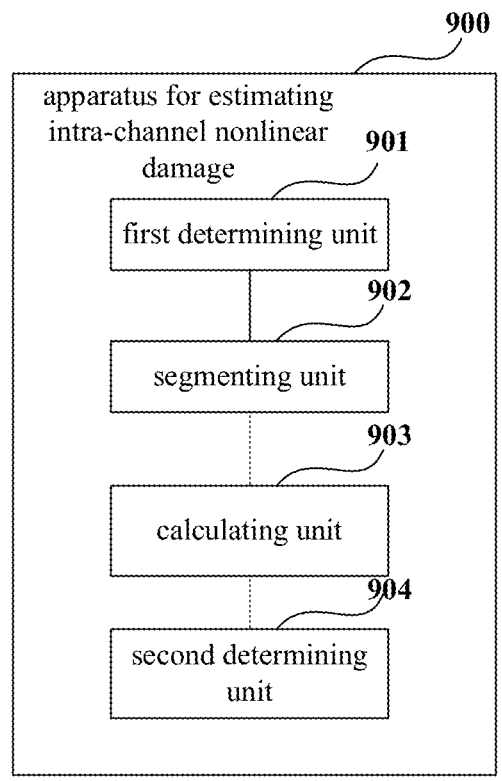
FIG. 9 is a schematic diagram of the structure of the apparatus for estimating intra-channel nonlinear damage of Embodiment 2 of the present invention.

FIG. 9 is a schematic diagram of the structure of the apparatus for estimating intra-channel nonlinear damage of Embodiment 2 of the present invention, which corresponds to the case in Embodiment 1 where the number of the rectangles is 1, that is, rectangularly approximating the nonlinear phase shift weighting dispersion distribution function of the optical fiber transmission link. As shown in FIG. 9, the apparatus 900 includes: a first determining unit 901, a segmenting unit 902, a calculating unit 903 and a second determining unit 904, wherein, first determining unit 901 is configured to determine a nonlinear phase shift weighting dispersion distribution function of an optical fiber transmission link according to a parameter of the optical fiber transmission link;

segmenting unit 902 is configured to segment the nonlinear phase shift weighting dispersion distribution function of the optical fiber transmission link into a rectangle;

calculating unit 903 is configured to calculate a nonlinear perturbation coefficient of the rectangle, so as to obtain a nonlinear perturbation coefficient of the optical fiber transmission link;

and second determining unit 904 is configured to determine intra-channel nonlinear damage of the optical fiber transmission link according to the nonlinear perturbation coefficient of the optical fiber transmission link.

It can be seen from the above embodiment that by approximating the nonlinear phase shift weighting dispersion distribution function of the optical fiber transmission link by using a rectangle, an amount of calculation may further be lowered and efficiency of calculation may be improved, and nonlinear damage in any dispersion management link may be estimated. Furthermore, the apparatus may be applicable to a single-polarization system or a polarization multiplexing system, and may be compatible with any modulation formats.

Figure 10:
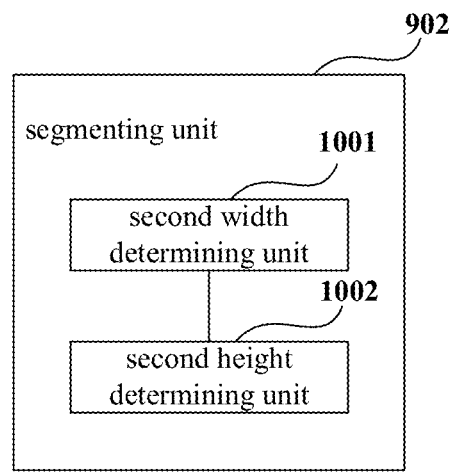
FIG. 10 is a schematic diagram of the structure of a segmenting unit of Embodiment 2 of the present invention.

In this embodiment, segmenting unit 902 is configured to segment the nonlinear phase shift weighting dispersion distribution function of the optical fiber transmission link into a rectangle. FIG. 10 is a schematic diagram of the structure of the segmenting unit of the embodiment. However, the present invention is not limited to such a structure. As shown in FIG. 10, segmenting unit 902 includes: a second width determining unit 1001 and a second height determining unit 1002; wherein, second width determining unit 1001 is configured to take boundary values of accumulative dispersion of the nonlinear phase shift weighting dispersion distribution function as the boundary values of the rectangle, and determine that the width of the rectangle is a difference between the boundary values of the rectangle;

and second height determining unit 1002 is configured to determine the height of the rectangle, so that an area of the rectangle is equal to an area under a curve of the nonlinear phase shift weighting dispersion distribution function between the two boundary values of the rectangle.

In this embodiment, assuming that the optical fiber transmission link consists of N sections of identical optical fiber spans, a length of each optical fiber span being $L_0$, and its attenuation $G(z_i)=-\alpha z_i$, and assuming that a dispersion coefficient $\beta_2$, an attenuation coefficient $\alpha$ and a nonlinear coefficient $\gamma$ of the optical fiber transmission link are all constants, loss of each optical fiber span is completely compensated for, and a dispersion compensation rate of each optical fiber span is $\eta$. Substituting the above conditions for equation (8), the following result may be obtained:

$$J(C) = \frac{1}{N|\beta_2|L_{\mathit{eff},0}} \sum_{i=1}^{N} \exp\left\{-\alpha\frac{C-(i-1)(1-\eta)\beta_2 L_0}{\beta_2}\right\} \quad (17)$$

where, N is the number of the optical fiber spans, N being an integer greater than 0, and $L_{\mathit{eff},0}=\int_0^{L_0}\gamma(z)\exp[G(z)]dz$ denotes an effective length of each optical fiber span.

In this embodiment, segmenting unit 902 is configured to segment the nonlinear phase shift weighting dispersion distribution function of the optical fiber transmission link into a rectangle. Wherein, second width determining unit 1001 determines the width of the rectangle according to a maximum value C2 and a minimum value C1 of the accumulative dispersion of the nonlinear phase shift weighting dispersion distribution function. And wherein, the width of the rectangle is a difference between the maximum value and the minimum value, that is C2-C1, and similar to embodiments 1, the height of the rectangle is $$\frac{1}{|C_2-C_1|}$$

according to a principle of equal area.

In this embodiment, assuming that C1=0 and C2>0 for a link of a dispersion compensation rate less than or equal to 1, then, $$\begin{cases} C_1 = 0 \\ C_2 = [(N-1)(1-\eta)+1]\beta_2 L_0 \end{cases} \quad 0 \leq \eta \leq 1; \quad (18)$$

and assuming that C1<0 and C2>0 for a link of a dispersion compensation rate greater than 1, then, $$\begin{cases} C_1 = (N-1)(1-\eta)\beta_2 L_0 \\ C_2 = \beta_2 L_0 \end{cases} \quad \eta > 1; \quad (19)$$

where, $\eta$ denotes a dispersion compensation rate of each span.

In this embodiment, a dispersion distribution function approximated by using a rectangle may be expressed as:

$$\hat{J}(C) = \begin{cases} \dfrac{f(C)-f(C-[(N-1)(1-\eta)+1]\beta_2 L_0)}{[(N-1)(1-\eta)+1]\beta_2 L_0} & 0 \leq \eta \leq 1 \\ \dfrac{f(C-(N-1)(1-\eta)\beta_2 L_0)-f(C-\beta_2 L_0)}{[1-(N-1)(1-\eta)]\beta_2 L_0} & \eta > 1 \end{cases} \quad (20)$$

In this embodiment, equation (20) may be substituted for equation (7), the nonlinear perturbation coefficient of the optical fiber transmission link is obtained:

$$\mathrm{Coef}(m,n,z) = \quad (21)$$

$$j\frac{8}{9}NL_{\mathit{eff},0}\int_{-\infty}^{+\infty}\int_{-\infty}^{+\infty} g(t_1-mT)g(t_2-nT)g^*(t_1+t_2-(m+n)T)$$

$$dt_1 dt_2 \int_{C_1}^{C_2}\frac{1}{|C_2-C_1||C|}e^{j\frac{t_1 t_2}{C}}dC$$

where, Coef(m,n,z) denotes the nonlinear perturbation coefficient of the optical fiber transmission link, t1 and t2 denote time integral variables, and T denote a pulse interval.

In this embodiment, similar to Embodiment 1, a closed-form solution of the above equation may be obtained by using existing means of pulse form approximation. For example, assuming that the link is lossless, and the rectangle satisfies a large dispersion approximation condition $|C_i|>>\tau^2$, where, $\tau$ is a Gaussian pulse width factor, a closed-form solution of equation (21) may be obtained, which is expressed as follows:

$$\mathrm{Coef}(m,n,z) = \quad (22)$$

$$\begin{cases} j\dfrac{8\tau^2 L_{\mathit{eff},0}}{9\sqrt{3}\,|\beta_2|L_0}\dfrac{N}{(N-1)(1-\eta)+1}E_1\!\left(-j\dfrac{mnT^2}{[(N-1)(1-\eta)+1]\beta_2 L_0}\right) & 0<\eta<1 \\ j\dfrac{8\tau^2 L_{\mathit{eff},0}}{9\sqrt{3}\,|\beta_2|L_0}\dfrac{N}{1-(N-1)(1-\eta)}\left[E_1\!\left(-j\dfrac{mnT^2}{\beta_2 L_0}\right)-E_1\!\left(-j\dfrac{mnT^2}{[1-(N-1)(1-\eta)]\beta_2 L_0}\right)\right] & \eta>1 \end{cases}$$

In this embodiment, as an actual link is approximated, equation (22) may be modified by using a factor ε; wherein, the factor ε may be optimized according to the actual link, which is expressed as follows:

$$\text{Coef}(m, n, z) = \qquad (23)$$

$$\begin{cases} j\varepsilon \dfrac{8\tau^2 L_{eff,0}}{9\sqrt{3}\,|\beta_2|L_0} \dfrac{N}{(N-1)(1-\eta)+1} E_1\!\left(-j\dfrac{mnT^2}{[(N-1)(1-\eta)+1]\beta_2 L_0}\right) & 0 \le \eta \le 1 \\ j\varepsilon \dfrac{8\tau^2 L_{eff,0}}{9\sqrt{3}\,|\beta_2|L_0} \dfrac{N}{1-(N-1)(1-\eta)} \left[ E_1\!\left(-j\dfrac{mnT^2}{\beta_2 L_0}\right) - E_1\!\left(-j\dfrac{mnT^2}{[1-(N-1)(1-\eta)]\beta_2 L_0}\right) \right] & \eta > 1 \end{cases}$$

Therefore, accuracy of the estimation of the intra-channel nonlinear damage by the apparatus may further be improved by setting and adjusting the factor ε.

In this way, an analytic closed-form solution of the nonlinear perturbation coefficient of the optical fiber transmission link is obtained by using equation (23), and second determining unit 904 may use equation (2) or (6) to obtain a nonlinear damage time-domain waveform of an optical signal transmitted in the optical fiber transmission link according to the nonlinear perturbation coefficient, thereby determining intra-channel nonlinear damage of the optical fiber transmission link.

The present invention is not limited to the mode of implementation described above in which boundary values of a rectangle are determined according to boundary values of the function J (C). In this embodiment, as another mode of implementation of segmenting unit 902, the boundary values of the rectangle may be determined by using a search optimization method, that is, segmenting unit 902 is made to execute the following steps: obtaining the nonlinear perturbation coefficient to which the rectangle corresponds based on predefined boundary values of the rectangle, thereby obtaining the nonlinear perturbation coefficient of the optical fiber transmission link; determining intra-channel nonlinear damage of the optical fiber transmission link according to the nonlinear perturbation coefficient of the optical fiber transmission link; comparing the obtained intra-channel nonlinear damage with intra-channel nonlinear damage obtained by using a split-step Fourier method; and adjusting the boundary values of the rectangle according to a result of comparison, until a similarity between the obtained intra-channel nonlinear damage and the intra-channel nonlinear damage obtained by using the split-step Fourier method is maximal.

Therefore, accuracy of the estimation of the intra-channel nonlinear damage by the apparatus may further be improved by determining the boundary values of the rectangle by using the above search optimization method.

Figure 11:
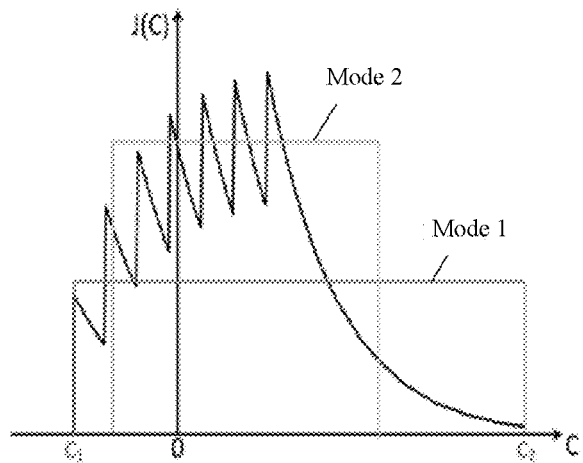
FIG. 11 is a schematic diagram of two modes of implementation for segmenting a function J (C) into one rectangle by using a segmenting unit of Embodiment 2 of the present invention.

FIG. 11 is a schematic diagram of two modes of implementation for segmenting a function J (C) into a rectangle by using segmenting unit 902 of this embodiment. As shown in FIG. 11, mode 1 is determining the boundary values of the rectangle by segmenting unit 902 according to the boundary values of the function J (C), and mode 2 is determining the boundary values of the rectangle by using the above search optimization method.

It can be seen from the above embodiment that by approximating the nonlinear phase shift weighting dispersion distribution function of the optical fiber transmission link by using a rectangle, an amount of calculation may further be lowered and efficiency of calculation may be improved, and nonlinear damage in any dispersion management link may be estimated. Furthermore, the apparatus may be applicable to a single-polarization system or a polarization multiplexing system, and may be compatible with any modulation formats.

Furthermore, accuracy of the estimation of the intra-channel nonlinear damage by the apparatus may further be improved by setting and adjusting the factor ε.

Furthermore, accuracy of the estimation of the intra-channel nonlinear damage by the apparatus may further be improved by determining the boundary values of the rectangle by using the above search optimization method.

Embodiment 3

Figure 12:
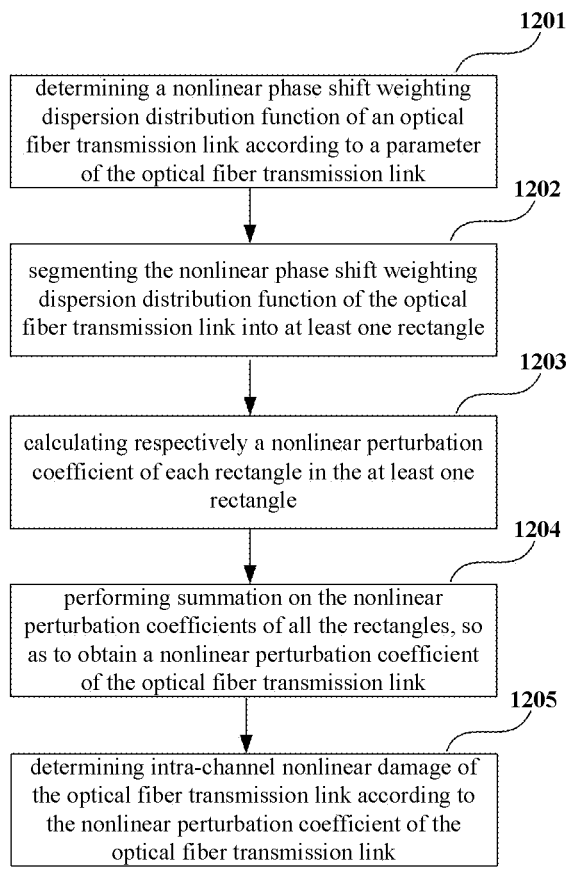
FIG. 12 is a flowchart of the method for estimating intra-channel nonlinear damage of Embodiment 3 of the present invention.

FIG. 12 is a flowchart of a method for estimating intra-channel nonlinear damage of the embodiment 3, the method corresponds to Embodiment 1. As shown in FIG. 12, the method includes:

step 1201: determining a nonlinear phase shift weighting dispersion distribution function of an optical fiber transmission link according to a parameter of the optical fiber transmission link;

step 1202: segmenting the nonlinear phase shift weighting dispersion distribution function of the optical fiber transmission link into at least one rectangle;

step 1203: calculating respectively a nonlinear perturbation coefficient of each rectangle in the at least one rectangle;

step 1204: performing summation on the nonlinear perturbation coefficients of all the rectangles, so as to obtain a nonlinear perturbation coefficient of the optical fiber transmission link; and step 1205: determining intra-channel nonlinear damage of the optical fiber transmission link according to the nonlinear perturbation coefficient of the optical fiber transmission link.

Figure 13:
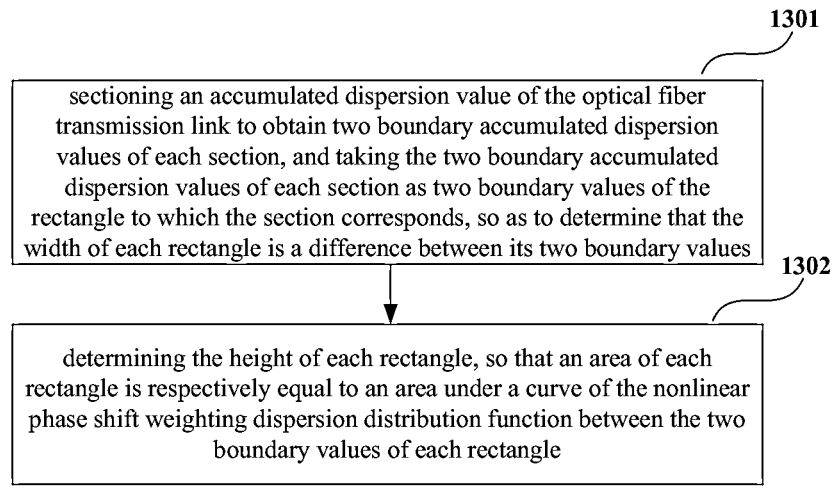
FIG. 13 is a flowchart of method of a mode of implementation for segmenting a function J (C) of an optical fiber transmission link into at least one rectangle of an embodiment of the present invention.

FIG. 13 is a flowchart of method of a mode of implementation for segmenting a function J (C) of an optical fiber transmission link into at least one rectangle of an embodiment of the present invention. However, the present invention is not limited to such a method. As shown in FIG. 13, the method includes:

step 1301: sectioning an accumulated dispersion value of the optical fiber transmission link to obtain two boundary accumulated dispersion values of each section, and taking the two boundary accumulated dispersion values of each section as two boundary values of the rectangle to which the section corresponds, so as to determine that the width of each rectangle is a difference between its two boundary values; and step 1302: determining the height of each rectangle, so that an area of each rectangle is respectively equal to an area under a curve of the nonlinear phase shift weighting dispersion distribution function between the two boundary values of each rectangle.

In this embodiment, the method for determining a nonlinear phase shift weighting dispersion distribution function, the method for segmenting the nonlinear phase shift weighting dispersion distribution function, the method for obtaining nonlinear perturbation coefficients of each rectangle and the optical fiber transmission link and the method for determining intra-channel nonlinear damage are all identical to those contained in Embodiment 1, which shall not be described herein any further.

It can be seen from the above embodiment that an analytic closed-form solution of the nonlinear perturbation coefficient of the optical fiber transmission link may be simply obtained by segmenting the nonlinear phase shift weighting dispersion distribution function of the optical fiber transmission link into at least one rectangle, that is, approximating the nonlinear phase shift weighting dispersion distribution function by using the at least one rectangle, and calculating respectively a nonlinear perturbation coefficient of each rectangle. Therefore, nonlinear damage in any dispersion management link may be estimated, and complexity of calculation may be lowered. Furthermore, the method may be applicable to a single-polarization system or a polarization multiplexing system, and may be compatible with any modulation formats.

Embodiment 4

Figure 14:
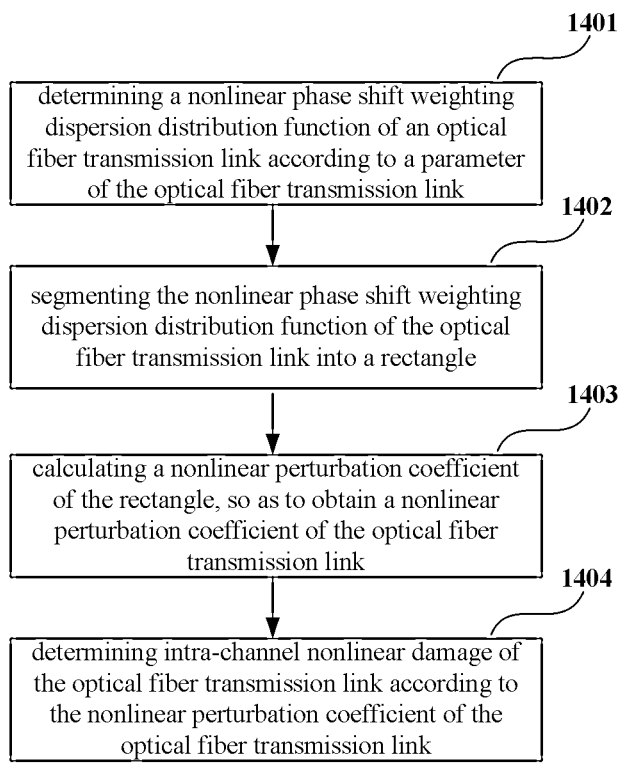
FIG. 14 is a flowchart of the method for estimating intra-channel nonlinear damage of Embodiment 4 of the present invention.

FIG. 14 is a flowchart of a method for estimating intra-channel nonlinear damage of the embodiment, the method corresponds to Embodiment 2. As shown in FIG. 14, the method includes:

step 1401: determining a nonlinear phase shift weighting dispersion distribution function of an optical fiber transmission link according to a parameter of the optical fiber transmission link;

step 1402: segmenting the nonlinear phase shift weighting dispersion distribution function of the optical fiber transmission link into a rectangle;

step 1403: calculating a nonlinear perturbation coefficient of the rectangle, so as to obtain a nonlinear perturbation coefficient of the optical fiber transmission link; and step 1404: determining intra-channel nonlinear damage of the optical fiber transmission link according to the nonlinear perturbation coefficient of the optical fiber transmission link.

It can be seen from the above embodiment that by approximating the nonlinear phase shift weighting dispersion distribution function of the optical fiber transmission link by using a rectangle, an amount of calculation may further be lowered and efficiency of calculation may be improved, and nonlinear damage in any dispersion management link may be estimated. Furthermore, the method may be applicable to a single-polarization system or a polarization multiplexing system, and may be compatible with any modulation formats.

Figure 15:
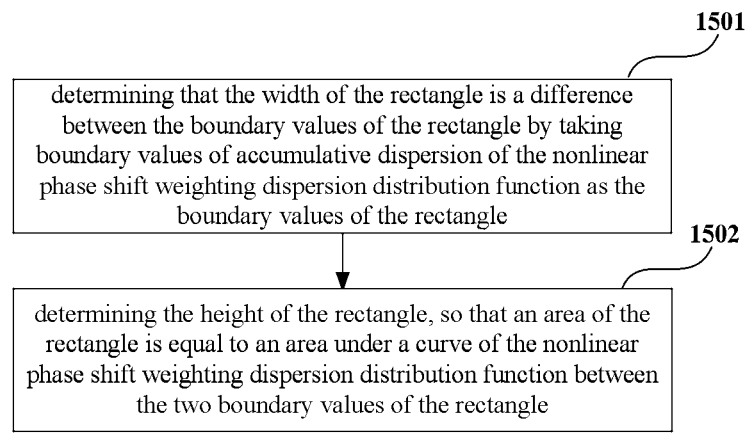
FIG. 15 is a flowchart of a method of a mode of implementation for segmenting a function J (C) of the optical fiber transmission link into one rectangle of Embodiment 4 of the present invention.

FIG. 15 is a flowchart of a method of a mode of implementation for segmenting a function J (C) of the optical fiber transmission link into a rectangle of this embodiment. However, the present invention is not limited to such a method. As shown in FIG. 15, the method includes:

step 1501: determining that the width of the rectangle is a difference between the boundary values of the rectangle by taking boundary values of accumulative dispersion of the nonlinear phase shift weighting dispersion distribution function as the boundary values of the rectangle; and step 1502: determining the height of the rectangle, so that an area of the rectangle is equal to an area under a curve of the nonlinear phase shift weighting dispersion distribution function between the two boundary values of the rectangle.

In this embodiment, the method for determining a nonlinear phase shift weighting dispersion distribution function, the method for segmenting the nonlinear phase shift weighting dispersion distribution function, the method for obtaining nonlinear perturbation coefficients of the rectangle and the optical fiber transmission link and the method for determining intra-channel nonlinear damage are all identical to those contained in Embodiment 2, which shall not be described herein any further.

In this embodiment, by setting and adjusting the factor $\epsilon$, the similarity between the intra-channel nonlinear damage obtained by using the method of this embodiment and the intra-channel nonlinear damage obtained by using a split-step Fourier method is made to be maximal. Therefore, accuracy of the estimation of the intra-channel nonlinear damage by the method may further be improved by setting and adjusting the factor $\epsilon$.

Figure 16:
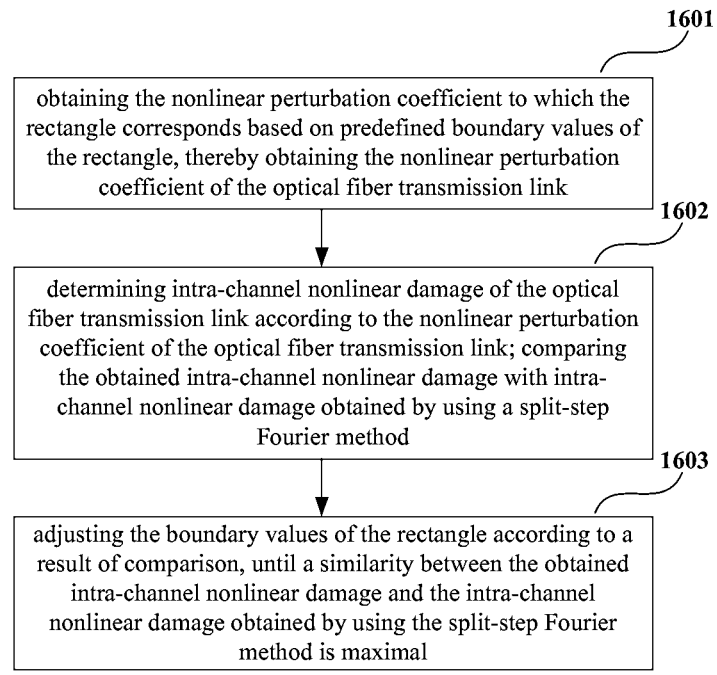
FIG. 16 is a flowchart of a method of another mode of implementation for segmenting a function J (C) of the optical fiber transmission link into one rectangle of Embodiment 4 of the present invention.

The present invention is not limited to the mode of implementation described above in which boundary values of a rectangle are determined according to boundary values of the function J (C). FIG. 16 is a flowchart of a method of another mode of implementation for segmenting a function J (C) of the optical fiber transmission link into a rectangle of this embodiment. However, the present invention is not limited to such a method. As shown in FIG. 16, the method includes:

step 1601: obtaining the nonlinear perturbation coefficient to which the rectangle corresponds based on predefined boundary values of the rectangle, thereby obtaining the nonlinear perturbation coefficient of the optical fiber transmission link;

step 1602: determining intra-channel nonlinear damage of the optical fiber transmission link according to the nonlinear perturbation coefficient of the optical fiber transmission link; comparing the obtained intra-channel nonlinear damage with intra-channel nonlinear damage obtained by using a split-step Fourier method; and step 1603: adjusting the boundary values of the rectangle according to a result of comparison, until a similarity between the obtained intra-channel nonlinear damage and the intra-channel nonlinear damage obtained by using the split-step Fourier method is maximal.

Therefore, accuracy of the estimation of the intra-channel nonlinear damage by the method may further be improved by determining the boundary values of the rectangle by using the search optimization method.

It can be seen from the above embodiment that by approximating the nonlinear phase shift weighting dispersion distribution function of the optical fiber transmission link by using a rectangle, an amount of calculation may further be lowered and efficiency of calculation may be improved, and nonlinear damage in any dispersion management link may be estimated. Furthermore, the method may be applicable to a single-polarization system or a polarization multiplexing system, and may be compatible with any modulation formats.

Furthermore, accuracy of the estimation of the intra-channel nonlinear damage by the method may further be improved by setting and adjusting the factor $\epsilon$.

Furthermore, accuracy of the estimation of the intra-channel nonlinear damage by the method may further be improved by determining the boundary values of the rectangle by using the above search optimization method.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above.

The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

An apparatus for estimating intra-channel nonlinear damage, including:

a first determining unit configured to determine a nonlinear phase shift weighting dispersion distribution function of an optical fiber transmission link according to a parameter of the optical fiber transmission link;

a segmenting unit configured to segment the nonlinear phase shift weighting dispersion distribution function of the optical fiber transmission link into at least one rectangle;

a calculating unit configured to respectively calculate a nonlinear perturbation coefficient of each rectangle in the at least one rectangle, and perform summation on the nonlinear perturbation coefficients of all the rectangles, so as to obtain a nonlinear perturbation coefficient of the optical fiber transmission link; and a second determining unit configured to determine intra-channel nonlinear damage of the optical fiber transmission link according to the nonlinear perturbation coefficient of the optical fiber transmission link.

The apparatus according to supplement 1, wherein the segmenting unit includes:

a first width determining unit configured to section an accumulated dispersion value of the optical fiber transmission link to obtain two boundary accumulated dispersion values of each section, and take the two boundary accumulated dispersion values of each section as two boundary values of the rectangle to which the section corresponds, so as to determine that the width of each rectangle is a difference between its two boundary values; and a first height determining unit configured to determine the height of each rectangle, so that an area of each rectangle is respectively equal to an area under a curve of the nonlinear phase shift weighting dispersion distribution function between the two boundary values of each rectangle.

The apparatus according to supplement 2, wherein the first width determining unit homogeneously or inhomogeneously sections the accumulated dispersion value of the optical fiber transmission link, so as to obtain the at least one rectangle of identical or different widths.

The apparatus according to supplement 1 or 2, wherein the segmenting unit segments the nonlinear phase shift weighting dispersion distribution function of the optical fiber transmission link into at least one rectangle according to inconsecutive points of the nonlinear phase shift weighting dispersion distribution function; and wherein two boundary values of each rectangle correspond to two adjacent inconsecutive points of the nonlinear phase shift weighting dispersion distribution function, or to one boundary point and one inconsecutive point adjacent to the boundary point of the nonlinear phase shift weighting dispersion distribution function.

The apparatus according to supplement 1, wherein the number of the at least one rectangle is one, and the segmenting unit is further configured to:

calculate a nonlinear perturbation coefficient of the one rectangle according to predetermined boundary values of the one rectangle, so as to obtain the nonlinear perturbation coefficient of the optical fiber transmission link; determine the intra-channel nonlinear damage of the optical fiber transmission link according to the nonlinear perturbation coefficient of the optical fiber transmission link; compare the obtained intra-channel nonlinear damage with intra-channel nonlinear damage obtained by using a split-step Fourier method; and adjust the boundary values of the one rectangle according to a result of comparison, until a similarity between the obtained intra-channel nonlinear damage and the intra-channel nonlinear damage obtained by using the split-step Fourier method is maximal.

The apparatus according to supplement 1, wherein the number of the at least one rectangle is one, and the segmenting unit includes:

a second width determining unit configured to determine that the width of the rectangle is a difference between the boundary values of the rectangle by taking boundary values of accumulative dispersion of the nonlinear phase shift weighting dispersion distribution function as the boundary values of the rectangle; and a second height determining unit configured to determine the height of the rectangle, so that an area of the rectangle is equal to an area under a curve of the nonlinear phase shift weighting dispersion distribution function between the two boundary values of the rectangle.

The apparatus according to supplement 2, wherein the calculating unit calculates a nonlinear perturbation coefficient of each rectangle in the at least one rectangle by using a large dispersion approximation condition; and wherein for a rectangle unsatisfying the large dispersion approximation condition, the height of the rectangle is lowered or set to be 0.

A method for estimating intra-channel nonlinear damage, including:

determining a nonlinear phase shift weighting dispersion distribution function of an optical fiber transmission link according to a parameter of the optical fiber transmission link;

segmenting the nonlinear phase shift weighting dispersion distribution function of the optical fiber transmission link into at least one rectangle;

calculating respectively a nonlinear perturbation coefficient of each rectangle in the at least one rectangle;

performing summation on the nonlinear perturbation coefficients of all the rectangles, so as to obtain a nonlinear perturbation coefficient of the optical fiber transmission link; and determining intra-channel nonlinear damage of the optical fiber transmission link according to the nonlinear perturbation coefficient of the optical fiber transmission link.

The method according to supplement 8, wherein the step of segmenting the nonlinear phase shift weighting dispersion distribution function of the optical fiber transmission link into at least one rectangle includes:

sectioning an accumulated dispersion value of the optical fiber transmission link to obtain two boundary accumulated dispersion values of each section, and taking the two boundary accumulated dispersion values of each section as two boundary values of the rectangle to which the section corresponds, so as to determine that the width of each rectangle is a difference between its two boundary values; and determining the height of each rectangle, so that an area of each rectangle is respectively equal to an area under a curve of the nonlinear phase shift weighting dispersion distribution function between the two boundary values of each rectangle.

The method according to supplement 8, wherein the step of sectioning an accumulated dispersion value of the optical fiber transmission link includes:

sectioning homogeneously or inhomogeneously the accumulated dispersion value of the optical fiber transmission link, so as to obtain the at least one rectangle of identical or different widths.

The method according to supplement 8 or 9, wherein the step of segmenting the nonlinear phase shift weighting dispersion distribution function of the optical fiber transmission link into at least one rectangle includes:

segmenting the nonlinear phase shift weighting dispersion distribution function of the optical fiber transmission link into at least one rectangle according to inconsecutive points of the nonlinear phase shift weighting dispersion distribution function; wherein two boundary values of each rectangle correspond to two adjacent inconsecutive points of the nonlinear phase shift weighting dispersion distribution function, or to one boundary point and one inconsecutive point adjacent to the boundary point of the nonlinear phase shift weighting dispersion distribution function.

The method according to supplement 8, wherein the number of the at least one rectangle is one, and the method further includes:

calculating a nonlinear perturbation coefficient of the one rectangle according to predetermined boundary values of the one rectangle, so as to obtain the nonlinear perturbation coefficient of the optical fiber transmission link;

determining the intra-channel nonlinear damage of the optical fiber transmission link according to the nonlinear perturbation coefficient of the optical fiber transmission link;

comparing the obtained intra-channel nonlinear damage with intra-channel nonlinear damage obtained by using a split-step Fourier method; and adjusting the boundary values of the one rectangle according to a result of comparison, until a similarity between the obtained intra-channel nonlinear damage and the intra-channel nonlinear damage obtained by using the split-step Fourier method is maximal.

The method according to supplement 8, wherein the number of the at least one rectangle is one, and the step of segmenting the nonlinear phase shift weighting dispersion distribution function of the optical fiber transmission link into at least one rectangle includes:

taking the boundary values of accumulated dispersion of the nonlinear phase shift weighting dispersion distribution function as boundary values of the rectangle, so as to determine that the width of the rectangle is a difference between the boundary values of the rectangle; and determining the height of the rectangle, so that an area of the rectangle is equal to an area under a curve of the nonlinear phase shift weighting dispersion distribution function between the two boundary values of the rectangle.

The method according to supplement 9, wherein a nonlinear perturbation coefficient of each rectangle in the at least one rectangle is calculated by using a large dispersion approximation condition; and wherein for a rectangle unsatisfying the large dispersion approximation condition, the height of the rectangle is lowered or set to be 0.

The invention claimed is:

1. An apparatus for estimating intra-channel nonlinear damage, comprising:
    a first determining unit configured to determine a nonlinear phase shift weighting dispersion distribution function of an optical fiber transmission link according to a parameter of the optical fiber transmission link;
    a segmenting unit configured to segment the nonlinear phase shift weighting dispersion distribution function of the optical fiber transmission link into at least one rectangle;
    a calculating unit configured to respectively calculate a nonlinear perturbation coefficient of each rectangle in the at least one rectangle, and perform summation on nonlinear perturbation coefficients of all rectangles, to obtain a nonlinear perturbation coefficient of the optical fiber transmission link; and
    a second determining unit configured to determine intra-channel nonlinear damage of the optical fiber transmission link according to the nonlinear perturbation coefficient of the optical fiber transmission link.

2. The apparatus according to claim 1, wherein the segmenting unit comprises:
    a first width determining unit configured to section an accumulated dispersion value of the optical fiber transmission link to obtain two boundary accumulated dispersion values of each section, and take the two boundary accumulated dispersion values of each section as two boundary values of the rectangle to which the section corresponds, to determine that a width of each rectangle as a difference between its two boundary values; and
    a first height determining unit configured to determine a height of each rectangle, so that an area of each rectangle is respectively equal to an area under a curve of the nonlinear phase shift weighting dispersion distribution function between the two boundary values of each rectangle.

3. The apparatus according to claim 2, wherein the first width determining unit one of homogeneously and inhomogeneously sections the accumulated dispersion value of the optical fiber transmission link, to obtain the at least one rectangle of one of identical and different widths.

4. The apparatus according to claim 1, wherein the segmenting unit segments the nonlinear phase shift weighting dispersion distribution function of the optical fiber transmission link into at least one rectangle according to inconsecutive points of the nonlinear phase shift weighting dispersion distribution function; and wherein two boundary values of each rectangle correspond to one of two adjacent inconsecutive points of the nonlinear phase shift weighting dispersion distribution function, and one boundary point and one inconsecutive point adjacent to the boundary point of the nonlinear phase shift weighting dispersion distribution function.

5. The apparatus according to claim 1, wherein a number of the at least one rectangle is one, and the segmenting unit is further configured to:
    calculate a nonlinear perturbation coefficient of the one rectangle according to predetermined boundary values of the one rectangle, to obtain the nonlinear perturbation coefficient of the optical fiber transmission link; determine the intra-channel nonlinear damage of the optical fiber transmission link according to the nonlinear perturbation coefficient of the optical fiber transmission link; compare the obtained intra-channel nonlinear damage with intra-channel nonlinear damage obtained by using a split-step Fourier method; and adjust the boundary values of the one rectangle according to a result of comparison, until a similarity between the obtained intra-channel nonlinear damage and the intra-channel nonlinear damage obtained by using the split-step Fourier method is maximal.

6. The apparatus according to claim 1, wherein a number of the at least one rectangle is one, and the segmenting unit comprises:
    a second width determining unit configured to determine that a width of the rectangle is a difference between the boundary values of the rectangle by taking boundary values of accumulative dispersion of the nonlinear phase shift weighting dispersion distribution function as the boundary values of the rectangle; and a second height determining unit configured to determine a height of the rectangle, so that an area of the rectangle is equal to an area under a curve of the nonlinear phase shift weighting dispersion distribution function between the two boundary values of the rectangle.

7. The apparatus according to claim 2, wherein the calculating unit calculates a nonlinear perturbation coefficient of each rectangle in the at least one rectangle by using a large dispersion approximation condition; and wherein for a rectangle not satisfying the large dispersion approximation condition, the height of the rectangle is one of lowered and set to be 0.

8. A method for estimating intra-channel nonlinear damage, comprising:
   determining a nonlinear phase shift weighting dispersion distribution function of an optical fiber transmission link according to a parameter of the optical fiber transmission link;
   segmenting the nonlinear phase shift weighting dispersion distribution function of the optical fiber transmission link into at least one rectangle;
   calculating, by a processor, respectively a nonlinear perturbation coefficient of each rectangle in the at least one rectangle;
   performing summation on nonlinear perturbation coefficients of all rectangles, to obtain a nonlinear perturbation coefficient of the optical fiber transmission link; and
   determining intra-channel nonlinear damage of the optical fiber transmission link according to the nonlinear perturbation coefficient of the optical fiber transmission link.

9. The method according to claim 8, wherein the segmenting the nonlinear phase shift weighting dispersion distribution function of the optical fiber transmission link into at least one rectangle comprises:
   sectioning an accumulated dispersion value of the optical fiber transmission link to obtain two boundary accumulated dispersion values of each section, and taking the two boundary accumulated dispersion values of each section as two boundary values of the rectangle to which the section corresponds, to determine that a width of each rectangle is a difference between its two boundary values; and
   determining a height of each rectangle, so that an area of each rectangle is respectively equal to an area under a curve of the nonlinear phase shift weighting dispersion distribution function between the two boundary values of each rectangle.

10. The method according to claim 8, wherein the sectioning an accumulated dispersion value of the optical fiber transmission link comprises:
   sectioning one of homogeneously and inhomogeneously the accumulated dispersion value of the optical fiber transmission link, to obtain the at least one rectangle of one of identical and different widths.

11. The method according to claim 8, wherein the segmenting the nonlinear phase shift weighting dispersion distribution function of the optical fiber transmission link into at least one rectangle comprises:
   segmenting the nonlinear phase shift weighting dispersion distribution function of the optical fiber transmission link into at least one rectangle according to non-consecutive points of the nonlinear phase shift weighting dispersion distribution function; wherein two boundary values of each rectangle correspond to one of two adjacent non-consecutive points of the nonlinear phase shift weighting dispersion distribution function, and one boundary point and one non-consecutive point adjacent to the boundary point of the nonlinear phase shift weighting dispersion distribution function.

12. The method according to claim 8, wherein a number of the at least one rectangle is one, and the method further comprises:
   calculating a nonlinear perturbation coefficient of the one rectangle according to predetermined boundary values of the one rectangle, to obtain the nonlinear perturbation coefficient of the optical fiber transmission link;
   determining the intra-channel nonlinear damage of the optical fiber transmission link according to the nonlinear perturbation coefficient of the optical fiber transmission link;
   comparing the obtained intra-channel nonlinear damage with intra-channel nonlinear damage obtained by using a split-step Fourier method; and
   adjusting the boundary values of the one rectangle according to a result of comparison, until a similarity between the obtained intra-channel nonlinear damage and the intra-channel nonlinear damage obtained by using the split-step Fourier method is maximal.

13. The method according to claim 8, wherein a number of the at least one rectangle is one, and the segmenting the nonlinear phase shift weighting dispersion distribution function of the optical fiber transmission link into at least one rectangle comprises:
   determining that the width of the rectangle is a difference between the boundary values of the rectangle by taking boundary values of accumulative dispersion of the nonlinear phase shift weighting dispersion distribution function as the boundary values of the rectangle; and
   determining the height of the rectangle, so that an area of the rectangle is equal to an area under a curve of the nonlinear phase shift weighting dispersion distribution function between the two boundary values of the rectangle.

14. The method according to claim 9, wherein a nonlinear perturbation coefficient of each rectangle in the at least one rectangle is calculated by using a large dispersion approximation condition; and wherein for a rectangle not satisfying the large dispersion approximation condition, the height of the rectangle is one of lowered and set to be 0.

* * * * *